June 9, 1931.  C. H. DUNCAN  1,809,331
POWER UNIT FOR USE ON AUTOMOTIVE VEHICLES
Filed Sept. 22, 1925  2 Sheets-Sheet 1

June 9, 1931.  C. H. DUNCAN  1,809,331
POWER UNIT FOR USE ON AUTOMOTIVE VEHICLES
Filed Sept. 22, 1925  2 Sheets-Sheet 2

Inventor
Charles H. Duncan,
By Richey Slough & Watts
His Attorneys.

Patented June 9, 1931

1,809,331

UNITED STATES PATENT OFFICE

CHARLES H. DUNCAN, OF ERIE, PENNSYLVANIA

POWER UNIT FOR USE ON AUTOMOTIVE VEHICLES

Application filed September 22, 1925. Serial No. 57,981.

My invention relates to power units for use in connection with automotive vehicles, and relates more particularly to a centralized power unit and a mounting therefor whereby power may be distributed to actuate various devices carried by an automotive vehicle and whereby such devices may be operated simultaneously with or independently of each other.

An object of my invention is to provide an apparatus of the above named character whereby a centralized power unit may be utilized to operate one or more remote devices.

Another object of my invention is to construct a power unit for use with automotive vehicles including a combined power unit housing and a motor fuel receiving compartment whereby power generated within the housing may be utilized to feed motor fuel to the compartment in the housing compartment.

Another object of my invention is to construct a centralized power unit for use with automotive vehicles whereby the power unit may be utilized to operate a vehicle signal device and having a clutch device carried thereby for connecting the source of power to the signal device.

Another object of my invention is to construct a centralized power unit for use with automotive vehicles which is extremely simple of construction and operation and which will utilize a comparatively small space when assembled upon the vehicle.

Other objects and advantages of my invention will become more apparent as the following description progresses, reference being made to the accompanying drawings which form a part of this specification and in which like characters are employed to designate like parts throughout the same.

Fig. 5 is a detail view partly in section of mechanism for operating a wind shield cleaner or other mechanism and showing the power connection thereto.

Fig. 6 is a diagrammatic view of the electrical circuit employed in operating the power unit and horn actuating parts, and Fig. 7 is an elevation of a second form of my invention showing a power connection to the engine cam shaft and a mechanically operated horn clutch.

Figure 1:
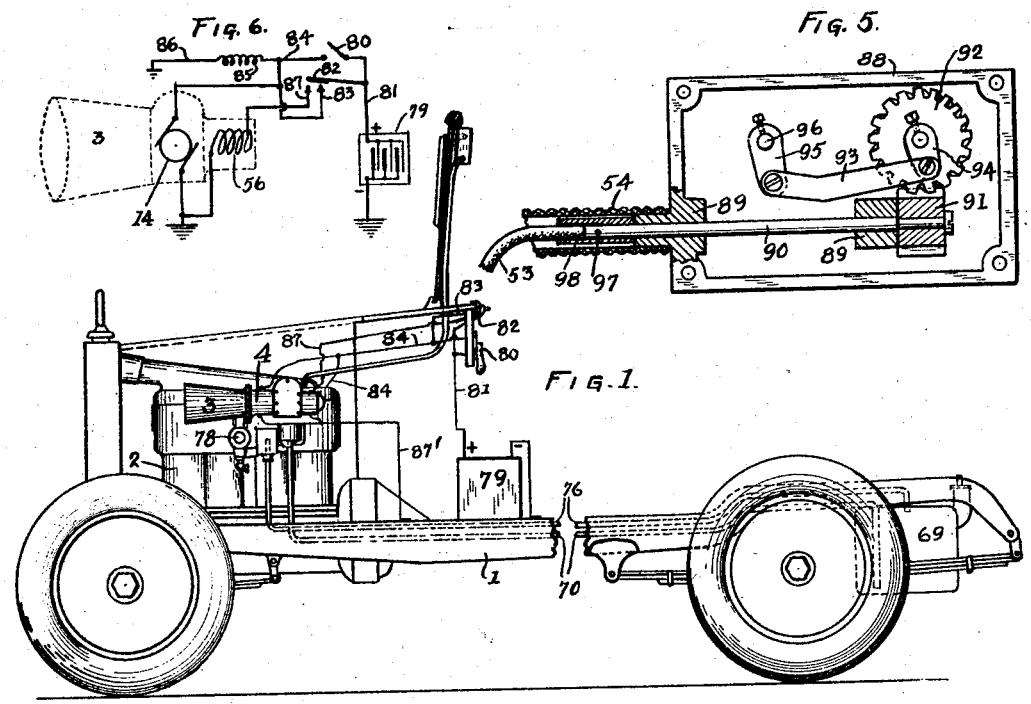
Fig. 1 is a side elevation of an automobile chassis showing my power unit in position under the hood, and also showing the pipe connections from the gasoline tank to the device.
Figure 2:
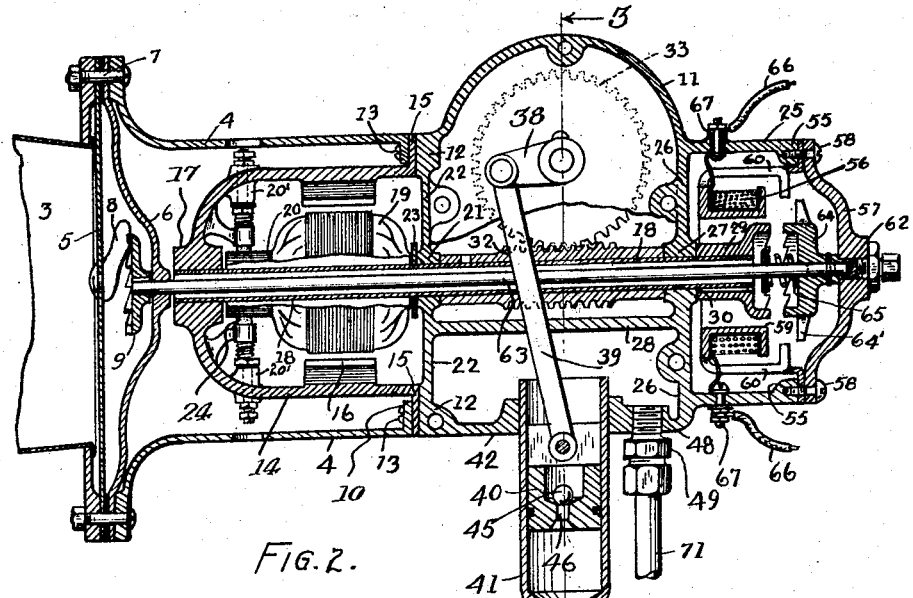
Fig. 2 is an enlarged vertical longitudinal section of the device showing part of the horn broken away.
Figures 3, 4:
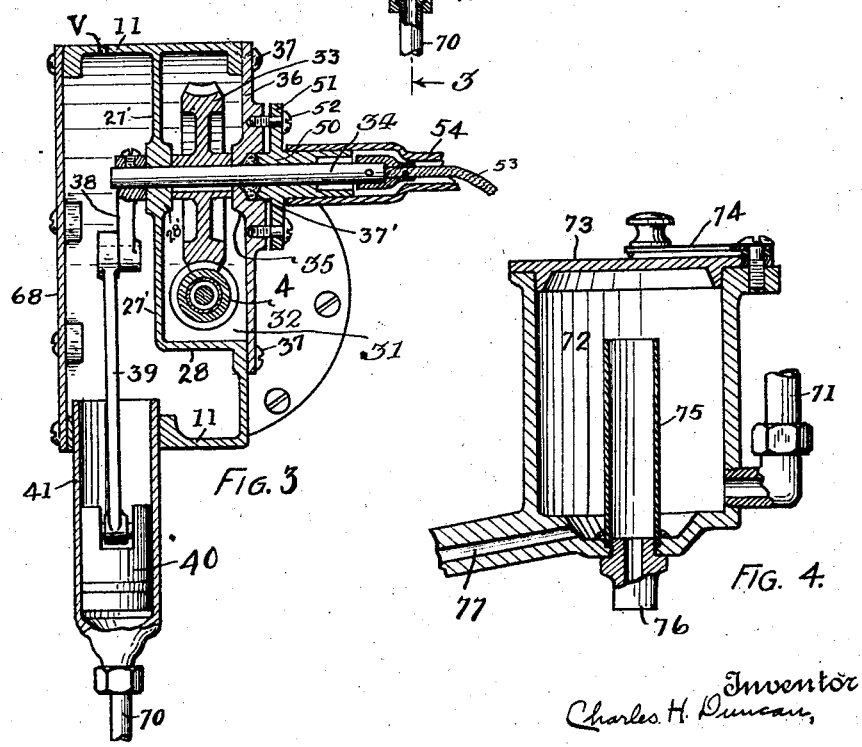
Fig. 3 is a vertical transverse section taken on line 3—3 of Fig. 2, showing the fuel storage compartment.
Fig. 4 is an enlarged detail view mostly in section showing a motor fuel receiving receptacle used in connection with my device.

In the drawings in Figs. 1, 2 and 3 showing one embodiment of my invention, I have represented at 1 an automobile chassis having the usual engine block 2 mounted thereon. A horn 3 is bolted to a motor casing 4 together with a diaphragm 5 and a shaft supporting spider 6, secured by the bolts 7. The diaphragm 5 is provided with a projection or stud 8 which is adapted to contact with a toothed actuator 9 when the latter is projected to rotate in the path of the member 8.

The casing 4 extends rearwardly and terminates in an annular inturned flange 10. A housing 11 having reinforced tapped portions 12 is adapted to be secured to the casing 4 by means of screws 13. An electric motor frame 14 is provided with an outwardly extending flange 15 which is adapted to seat between the flange 10 of the casing 4 and the outer surfaces of the reinforced portions 12 and is provided with apertures in alignment with the screw holes in the flange 10 to permit screws 13 to pass therethrough to secure the motor frame 14 in a rigid position within the casing 4.

The motor frame 14 is provided with the usual field poles 16 and terminates at one end in a bearing 17. A hollow shaft 18 which carries an armature 19 and a commutator 20 rotates within the bearing 17 at one end and extends through a bearing 21 formed in the wall 22 of the housing 11. A washer or the like 23 is provided about the shaft 18 intermediate one end of the armature windings and one end of the bearing 21. Suitable insulated brushes 24 are carried within the motor frame 14 and bear against the segments of the commutator 20 in the usual manner. Insulated binding posts 20′ are mounted on the motor frame, and are adapted to receive wires leading from a source of electrical current for supplying current to the motor.

The housing 11 is provided at its right hand end, in Fig. 2, with an extension defined by the walls 25, and is also provided near this end with a partition wall 26 having a bearing 27 therein which is in alignment with the bearing 21. A partition wall 28 is formed preferably transversely in the lower portion of the housing 11 and its ends are integrally formed with the walls 22 and 26 respectively. This partition wall extends transversely and then upwardly of the housing 11, as at 27′, Fig. 3, and is provided with a bearing 28′ in the upwardly extending portion 27′. A vent V is provided in the housing 11 as shown in Fig. 3. It will be noted then that by this novel construction I have formed a fuel receiving compartment in the forward and lower portions of the housing 11 and this compartment may be more accurately defined as the space enclosed by the upper wall of the housing 11, and the walls 22, 26, 27′, 28, 42, and plate 68.

The hollow shaft 18 extends through the bearings 21 and 27 and into the extending housing 25 and carries on one extreme end a toothed clutch member 29. The toothed clutch member 29 is keyed to the hollow shaft 18 to rotate therewith and its end 30 has a thrust bearing contact with the outer side walls of the bearing 27.

Keyed to the hollow shaft 18 within the compartment 31 of the housing 11 formed by the walls 11, 27′, 28 and plate 36, Fig. 3, is a worm 32 the ends of which have bearing engagement with the respective facing end surfaces of the bearings 21 and 27. A worm gear 33 is keyed to rotate with a shaft 34 which is supported at one end within the bearing 28′, and at another point within a bearing 35 formed in a plate 36 which is secured to the rear of the housing 11 by screws 37. Suitable packing material 37′ may be provided in the bearing 35 if desired. Shaft 34 extends forwardly of the bearing 28′ and is provided with a detachable crank arm 38. A connecting rod 39 is pivotally secured at one end to the free end of the arm 38 and at its other end to a piston 40. A cylinder 41 is carried in the lower wall 42 of the housing 11 and is in communication at its top with the motor fuel receiving compartment of the housing 11. The lower end of the cylinder 41 terminates in a pipe connection 43, to which a pipe 70 leading to the fuel tank 69, is coupled, a check valve and valve seat 44 is provided in the lower portion of the cylinder to prevent back flow of fuel from the cylinder through the pipe 70. Piston 40 is likewise provided with a check valve 45 which seats within an opening 46 in the lower wall of the piston. A discharge opening 48 is provided in the bottom of the housing 11 and is adapted to receive an outlet pipe connection 49.

One end of the shaft 34 extends through the bearing 35 and through a bearing 50 formed in a plate 51 which latter is secured to the plate 36 by means of screws 52. This end of the shaft 34 is adapted for detachable connection with a flexible cable or the like 53 which is carried within a protective tubing 54. In this embodiment of my invention, I have provided the cable 53 for transmitting power from the shaft 34 to a wind shield cleaner or like device which is shown in detail in Fig. 5, but I may also transmit power through the cable 53 to any other device or accessory carried on the vehicle.

Referring again to Fig. 2, the auxiliary housing 25 is provided with a flange 55 to which is adapted to be secured an electromagnetic device 56, and an end plate 57, by means of the screws 58.

This electro-magnetic device preferably consists of a solenoid magnet 59 having pole pieces 60 extending preferably rearwardly and inwardly as shown in the drawings.

Within the hollow shaft 18 and supported by a suitable bearing 61 in the spider 6 at its forward end and a suitable thrust bearing 62 carried by the end plate 57, is a diaphragm actuating shaft 63, having keyed thereto at its forward end a toothed diaphragm actuating member 9 and slidably and rotatably keyed to its rearward end, a toothed clutch member 64. The member 9 is normally in contact with the stud 8 of the diaphragm 5 and when the clutch members 29 and 64 are engaged and the shaft 63 is being rotated under power, the actuator 9 will impart vibrations to the diaphragm 5 to cause the signal to be given. The member 64 is provided with outwardly extending armature portions 64′ formed of magnetic material which are adapted to be sucked between the pole pieces 60 with the member 64 when the coil 56 is energized. The clutch members 29 and 64 are in alignment and are dished on their adjacent faces. A coil spring 65 is disposed between the clutch members 29 and 64 and normally exerts its compression thereagainst to force the clutch member 64 to the right of Fig. 2 along shaft 63. The right hand end of shaft 63, Fig. 2 is supported in a thrust bearing formed in the end plate 57 and I have provided an adjustable thrust bearing surface 62 whereby the movement of the shaft from left to right may be adjusted if desired. Suitable wires 66 leading from a current source and a circuit make and break device are adapted to be secured to suitable insulated binding posts 67 carried by the casing 25 and which are connected to the windings of the electro-magnetic device.

It will be noted that within the housing 11 I have provided a motor fuel receiving compartment which is defined by the walls 11, 22, 26, 27', 28, 42 and plate 68, and which is used to temporarily store motor fuel drawn from the tank 69 by the operation of the piston 40. When the apparatus is in operation, upward movement of the piston 40 within the cylinder 41 will cause motor fuel to be drawn from the tank 69 through the pipe 70, pass the valve 44 and flow into the cylinder 41. Downward movement of the piston will cause the valve 44 to close and the valve 45 to open whereby the fuel will be lifted from the cylinder through the opening in the piston and into the fuel receiving compartment within the housing 11. The fuel collected within this compartment is discharged by gravity through the opening 48 and carried by means of a pipe 71 to a reserve storing receptacle 72 which is shown in detail in Fig. 4. This receptacle is provided with a removable cover 73 which may be held in place by a spring arm or the like 74. An overflow pipe 75 extends within the receptacle 72 to a point near the top thereof and is adapted to carry off any excess fuel above the level of this pipe, through a pipe 76 and back to the tank 69 where the excess fuel will be deposited. A second outlet 77 is provided in the lower portion of the receptacle 72 and communicates with the fuel chamber of the usual carbureter 78 from whence it is supplied to the engine cylinders.

The motor is operated by electrical current from a storage battery 79 or any other suitable source of electrical energy as indicated in Fig. 1, and in the diagram shown in Fig. 6. The negative pole of the battery is preferably grounded to the vehicle frame, as shown, although a separate return wire may be used if desired. The positive pole of the battery is connected to one terminal of the usual ignition switch 80 and a bridging contact switch 82 by means of a wire 81. A wire 84 leads from the other terminal of switch 80 and connects to one terminal of the magneto 85, while the other terminal of the magneto 85 is connected by a wire 86 to the vehicle frame to provide the ground connection to the negative pole of the battery. One terminal of the motor 14 is connected through a wire to the wire 84 and a contact 83 while one terminal of the coil 56 is connected through a wire to a contact 87. These contacts are arranged to be bridged by the switch arm 82 in such a manner that when the arm is depressed the contact 83 connected to the motor will be first connected to the positive side of the battery and will remain so connected while the arm is further depressed to engage the contact 87 connected to the coil 56. In this manner, it will be seen that I have provided means in the form of a bridging switch whereby the motor 14 may be connected to the battery independently of or through the ignition switch as desired so that the driver may operate the motor to pump motor fuel or perform other functions as described herein and while the vehicle is at rest. By depressing the arm 82 so that the contact 87 is engaged the clutch 29 will be engaged to operate the signal device. The opposite terminals of the motor 14 and the coil 56 are connected to the vehicle ground by a wire 87'.

Referring to Fig. 5, which shows mechanism by which a windshield wiper or other device may be operated, I provide a casing 88 which may be secured to the windshield frame in any suitable manner. This casing is provided with bearings 89 in which a shaft 90 is rotatably mounted. One end of the shaft carries a helical gear 91 which is in mesh with a second helical gear 92 rotatably mounted within the casing. A connecting rod 93 connects with an arm 94 rotatable with the gear 92 and with a rocker arm 95 which is secured to a wiper shaft 96. By means of this arrangement I am enabled to transmit power which is applied to the shaft 90 through a minimum of elements and to apply that power effectively to a wiper or the device which is secured to the outer end of the shaft 96. As is shown in Fig. 5, the flexible cable 53 is detachably connected to the shaft 90 by a pin 97, while a sleeve 98 may be provided to prevent accidental displacement of the pin.

It will be noted from the above description and the drawings that I have provided a very efficient centralized power unit for performing various functions at different points about the vehicle, such as pumping motor fuel into a storage tank for reserve supply, and operating a signal device or windshield cleaner or other desired mechanisms.

It will also be noted that I have provided a very economically constructed apparatus for performing the various functions outlined herein.

In operation, the ignition switch 80 may be closed independently of the motor and signal circuit completing switch 82 to pump motor fuel from the tank 69 to the receiving compartment in the housing 11 whereupon it will be delivered to the carburetor for consumption in the engine. Operation of the motor likewise will cause mechanical energy to be transmitted through the cable 53 to operate the mechanism shown in Fig. 5. During the operation of the motor and when it is desirable to give an audible signal, as by sounding the horn 3, the operator merely closes the switch 82 entirely whereby the coil 56 is energized and causes the armature 64' to be moved to the left in Fig. 2, engaging the clutch members 29 and 64 and causing the actuator 9 to be rotated in contact with the projection on the horn diaphragm 5.

In Fig. 7 I have illustrated another embodiment of my invention which consists in providing a centralized power unit and a novel housing therefor adapted to be operated through a power connection preferably to the engine, although it is to be understood that I may, if desired, provide a power connection to the vehicle transmission, or to any part of the engine or vehicle where such power connection may be had by means of simple gearing or flexible driving connection. As shown in Fig. 7, I provide means for taking the power from the cam shaft 100 of the engine, consisting of a bevel gear 101 rotatable with the cam shaft and meshing with a similar gear 102 keyed to a substantially vertical shaft 103. The upper end of the shaft 103 is provided with a gear 104 which meshes with a similar gear 105 keyed to the hollow shaft 18. It will be noted that by means of this construction I am enabled to greatly reduce the size of the motor casing 4 and utilize this casing to house the gears 104 and 105. The power is transmitted through the shaft 18 to the various points as described in connection with the apparatus shown in Figs. 1, 2 and 3, except that in the present form I have eliminated the magnetic clutch device and have provided in its place a clutch member 29, a collar 106 slidably and rotatably mounted on the shaft 18, said collar having clutch teeth thereon for engaging the clutch teeth on the member 29 when the collar is moved toward the said member, and a collar actuating arm 107 pivoted at 108. This arm engages the collar as shown, and is adapted to shift the collar into and out of position with the member 29. The upper end of the arm 107 is provided for connection with a rod or any other connection 109 extending to the vehicle dash-board or steering column for rocking the arm. When the rod 109 is pulled by the operator, the clutch members are engaged and power is transmitted through the clutch to the diaphragm of the horn to give the signal.

Referring to the embodiment of my invention shown in Figs. 1 to 6, inclusive, it will be noted that I have provided an anti-theft signal means which consists of sounding the horn 3 whenever it is attempted to start the vehicle engine by closing the switch 82. Referring particularly to Fig. 6, it will be seen that when the car has been locked by locking the ignition switch 80 into "open" position as is the usual custom, and when it is attempted to operate the magneto by depressing the switch 82, to bridge the contacts 83 and 87, and energize wire 84, the motor 14 will be operated to give an alarm. Consequently the engine cannot be operated while the switch 82 is in complete closed position without sounding the alarm.

Various changes may be made in the construction of my device without departing from the spirit of my invention or the scope of the subjoined claims.

What I claim is:—

1. A power unit comprising a motor, a hollow drive shaft operable by the motor, a casing enclosing the motor and hollow shaft, said casing forming a liquid reservoir, a conduit communicating therewith, and means operable by the hollow shaft adapted to draw liquid through the conduit into the reservoir.

2. A power unit for an automobile comprising a housing provided with separated chambers, one of which is a liquid receiving chamber in communication with liquid reservoirs, a motor housed in another of the chambers, a shaft rotatably driven by the motor, and means driven by the motor for pumping liquid into the liquid receiving chamber.

3. A power unit for an automobile comprising a housing provided with separated chambers, one of which is a liquid receiving chamber in communication with liquid reservoirs, a motor housed in another of the chambers, a shaft rotatably driven by the motor, and means driven by the motor for pumping liquid into the liquid receiving chamber, said means including a member driven by said shaft and disposed outside of said liquid receiving chamber.

4. A self-contained power unit for an automobile comprising a housing provided with a plurality of enclosed chambers, a motor in one of the said chambers, a hollow shaft rotatably driven by the motor and extending into a plurality of the remaining chambers, the shaft being provided in such chambers with means for driving a plurality of instrumentalities.

In testimony whereof I hereunto affix my signature this 2nd day of September, 1925.

CHARLES H. DUNCAN.